(12) United States Patent
Bradley

(10) Patent No.: US 6,691,160 B1
(45) Date of Patent: Feb. 10, 2004

(54) INPUT/OUTPUT COMMUNICATION NETWORKS AND BOOTING PROTOCOLS

(75) Inventor: Mark W. Bradley, Boulder, CO (US)

(73) Assignee: Adaptec, Inc., Milpitas, CA (US)

( * ) Notice: Subject to any disclaimer, the term of this patent is extended or adjusted under 35 U.S.C. 154(b) by 0 days.

(21) Appl. No.: 09/552,289

(22) Filed: Apr. 19, 2000

(51) Int. Cl.[7] .......................................... G06F 15/177
(52) U.S. Cl. .................... 709/222; 709/220; 709/221; 709/230
(58) Field of Search ................................ 709/220–222, 709/230; 710/10, 104; 713/2

(56) References Cited

U.S. PATENT DOCUMENTS

| 5,230,052 | A | * | 7/1993 | Dayan et al. ................... 713/2 |
| 5,933,631 | A | * | 8/1999 | Mealey et al. .................. 713/2 |
| 5,978,912 | A | * | 11/1999 | Rakavy et al. .................. 713/2 |
| 5,987,605 | A | * | 11/1999 | Hill et al. ....................... 713/2 |
| 6,079,016 | A | * | 6/2000 | Park ............................... 713/2 |
| 6,101,601 | A | * | 8/2000 | Matthews et al. .............. 713/2 |
| 6,182,182 | B1 | * | 1/2001 | Bradley et al. ............. 710/310 |
| 6,282,642 | B1 | * | 8/2001 | Cromer et al. ................. 713/2 |
| 6,356,965 | B1 | * | 3/2002 | Broyles et al. ............. 710/104 |
| 6,401,140 | B1 | * | 6/2002 | Wu ............................. 710/10 |
| 6,421,777 | B1 | * | 7/2002 | Pierre-Louis et al. .......... 713/2 |
| 6,446,203 | B1 | * | 9/2002 | Aguilar et al. ................. 713/2 |
| 6,463,530 | B1 | * | 10/2002 | Sposato ......................... 713/2 |

* cited by examiner

Primary Examiner—Nabil Elhady
(74) Attorney, Agent, or Firm—Martine & Penilla, LLP (57) ABSTRACT

Methods for booting a computer from logically remote end nodes are provided. In one example, after a computer is powered up, a method validates end nodes that are logically remote from the computer. The method then communicates with a validated end node. The method determines what peripheral devices are attached to the validated end node and ascertains what boot images are available on the peripheral devices. A selection of a boot image from the peripheral device can then be made and the method proceeds to boot the computer. The booting process of the computer does not use a native BIOS/ROM of the computer, thus enabling the booting from any operating system, without regard to the type of hardware associated with the native BIOS/ROM. Further, the described methods enable booting from the storage of any end node on a network fabric.

20 Claims, 8 Drawing Sheets

INPUT/OUTPUT COMMUNICATION NETWORKS AND BOOTING PROTOCOLS

BACKGROUND OF THE INVENTION

1. Field of the Invention

This invention relates generally to computers using switched fabrics, and more particularly to input/output (I/O) protocols to facilitate the booting of computers from a logically remote source.

2. Description of the Related Art

Today's computers are moving towards becoming more interactive with other computers in a networking environment. This includes the ability for computers to communicate with other computers on a given network. As computers communicate, they are able to access files located on different computers. For example, using a well known networking transports such as Ethernet, one computer is able to access files stored on drives of other computers. Such drives have interfaces such as small computer system interface (SCSI) hard drives, IDE hard drives, SCSI or IDE optical disc drives (e.g., CDs, CD-Rs, CD-R/W, and DVDs), etc.

However, in order for a computer to access a network and other computers also connected to the network, the computer must first boot up. The computer typically boots up using hardware exclusive to that particular computer. Typically, a computer boots up by using a peripheral device connected to that computer. The peripheral device interfaces with the computer through connectors on the motherboard or through a host adapter. Most commonly, host adapters are internal to the computer and connect to the computer with a peripheral component interconnect (PCI) bus. Therefore, peripheral devices must communicate through a PCI bus before access is made to a computer's main memory (e.g., RAM). As such, use of the PCI bus can increase processing time since the PCI bus is a shared bus and necessarily prevents direct communication with the main memory of the computer. Unfortunately, this architecture is an industry standard that limits higher performance.

Host adapters (e.g., network interface cards "NICs") also allow the computer to interface with local area networks (LANs). The NICs can implement different types of network technologies such as Ethernet, ATM, Fibre Channel, and the like. Through the local area networks, computers are able to communicate with other computers and some shared peripheral devices, such as a server's hard drive. As such, all communication with other computers and the peripheral devices of other computers must be done through a computer having a suitable NIC. In a typical data exchange, the data at the source must travel over the drive's interface, through the internal PCI bus into memory, through the PCI bus again, through the NIC, over the network physical medium, and through the NIC and PCI bus of the receiving computer before communication can be established with the retrieving computer's main memory.

In a typical computing environment, each operating system (OS) will require its own hardware to operate and run applications specific to that operating system. For example, some computers may use the UNIX™ OS to run UNIX™ applications, the Sun Microsystems Inc. Solaris™ OS to run Solaris™ applications, and so on. In this situation, a user operating a computer using the Solaris™ OS will not generally be able to run Windows™ OS based applications. One way for the user to run a Windows™ application is to have a separate bootable Windows™ image on the same hard drive or have another dedicated drive connected to the local computer over the PCI bus to run the Windows™ OS. This is provided the native system BIOS or other boot ROM executable allows such boot ups. This is because some system BIOS chips only enable boot ups to certain types of OS's. As can be appreciated, this introduces substantial increases in cost since the user will have to obtain larger storage drives, purchase separate OS software and applications from different venders and so on.

Another way to provide a user the ability to run another OS is to use what is called "trivial file transfer protocol (TFTP)." Using TFTP, a user of a local computer can communicate with a remote computer which may have a desired boot OS image stored on its local storage (i.e., a drive connected to the remote computer). However, in order to facilitate an TFTP transfer, the computer requesting the information must use the computing and processing power of the remote computer in order to gain access to the desired OS image. In addition, the requesting computer may not communicate directly with the memory of the remote computer, but must transfer files by way of the remote computer's PCI bus and then to the remote computer's storage. Once this type of communication is established and access is made to the desired bootable OS image, the requesting computer will necessarily rely on the processing power of the remote computer. Thus, if the remote computer is not ON, not booted, or if it fails in any way, the TFTP communication will be lost, along with the ability to boot from the remote host.

In view of the foregoing, there is a need to allow computers to efficiently operate and gain access to a variety of operating systems, the capability of sharing networked devices to boot from, and use operating systems stored on the networked devices as well as to run applications.

SUMMARY OF THE INVENTION

Broadly speaking, the present invention fills the aforementioned needs by providing methods and apparatus for booting a computer system from boot images stored in logically remote storage over a network. It should be appreciated that the present invention can be implemented in numerous ways, including as a process, an apparatus, a system, a device, a method, or a computer readable media. Several embodiments of the present invention are described below.

In one embodiment, a method for automatically booting a computer from a remote source is disclosed. The method includes validating end nodes (e.g., discovery of end nodes) that are logically remote from the computer and communicating with a validated end node that is logically remote from the computer. After the computer communicates with the validated end node, a determination is made as to whether the validated end node (e.g., storage connected to the end node) has a desired boot image to boot the computer. If the desired boot image is present, the computer is booted using this desired boot image obtained from the validated end node without processing assistance of a remote computer. In a preferred implementation, the end node can be located anywhere on a network (e.g., either physically near the host computer or at a remote location). All end nodes are logically remote.

In another embodiment, a method for manually booting a computer from a remote source is disclosed. A boot select option ROM (BSOR) is accessed, wherein the BSOR allows the computer to boot from a logically remote end node or from the computer's local storage medium (e.g., connected by way of a PCI/SCSI bus). When a user elects to boot from a logically remote end node, the method proceeds to validate logically remote end nodes and does not use the host computer's native BIOS/ROM chip. Once the method validates logically remote end nodes, the method determines what boot images connected to the end nodes of the network are available to boot the computer. A specified boot image is then uploaded from the validated logically remote end node and a microprocessor of the computer boots the computer using the boot image form the validated logically remote end node.

In still a further embodiment, a method for booting a computer from a remote source is disclosed. Logically remote end nodes on a network are first validated before the method communicates with the validated logically remote end nodes. The method then ascertains (e.g., by proxy agent or the like) what boot images are available on the validated logically remote end nodes. Once the available boot images are ascertained, the method uploads an ascertained boot image from a validated logically remote end node to boot the computer. The computer then boots with its own microprocessor using the boot image uploaded from the validated logically remote end node without the assistance of a remote computer.

The advantages of the present invention are numerous. Most notably, the embodiments of the invention allow a user to search for logically remote end nodes on a network and determine what end nodes contain boot images capable of booting the user's computer. The booting can thus occur off any number of different operating systems. In the prior art, it was not possible to boot a local computer from remotely located storage without the processing power of a remote computer. Instead, the most common environment is to have each computer boot from its own hard drive or drives prior to accessing the peripheral devices of another computer located on a network. This increases both the size and cost of user computer systems which desire to have access to and boot from multiple boot images.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

An invention for a method of booting a host from a boot image that is in storage that is connected to a logically remote end node is disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

As an overview, the present invention uses a new type of fabric, future input/output (Future I/O), to interface with end nodes connected to a network. In a subnet, it is possible to have 64K nodes, where a node can be a host, an I/O adapter, a switch, or the like. Future I/O is a switched fabric architecture that enables routing to other fabrics, such as Ethernet, ATM and FDDI, using the well known Internet protocol (IP). Thus, Future I/O can accommodate N*64K nodes. Additionally, the Future I/O fabric is able to run at speeds up to about 1 GB/second or greater while accommodating a great amount of traffic in a shared fabric environment.

Communication is facilitated in the Future I/O fabric by enabling hosts to exchange memory-to-memory block I/O based messages and non-block I/O based messages (e.g., when communicating to tape drives and the like) to logically remote end nodes that are also connected to the Future I/O fabric. As mentioned above, the logically remote end nodes include hosts, I/O adapters, switches, and the like. The logically remote end nodes preferably have some type of storage media connected thereto (e.g., a hard disk drive, a tape drive, a RAID array, etc.). The host can communicate directly with any end node using message based I/O reads and I/O writes independent of file systems. Also, since the host is able to complete memory-to-memory communication, Future I/O does not require a microprocessor with an OS of a remote computer to assist in the communication as is needed in TFTP transfers.

Figure 1A:
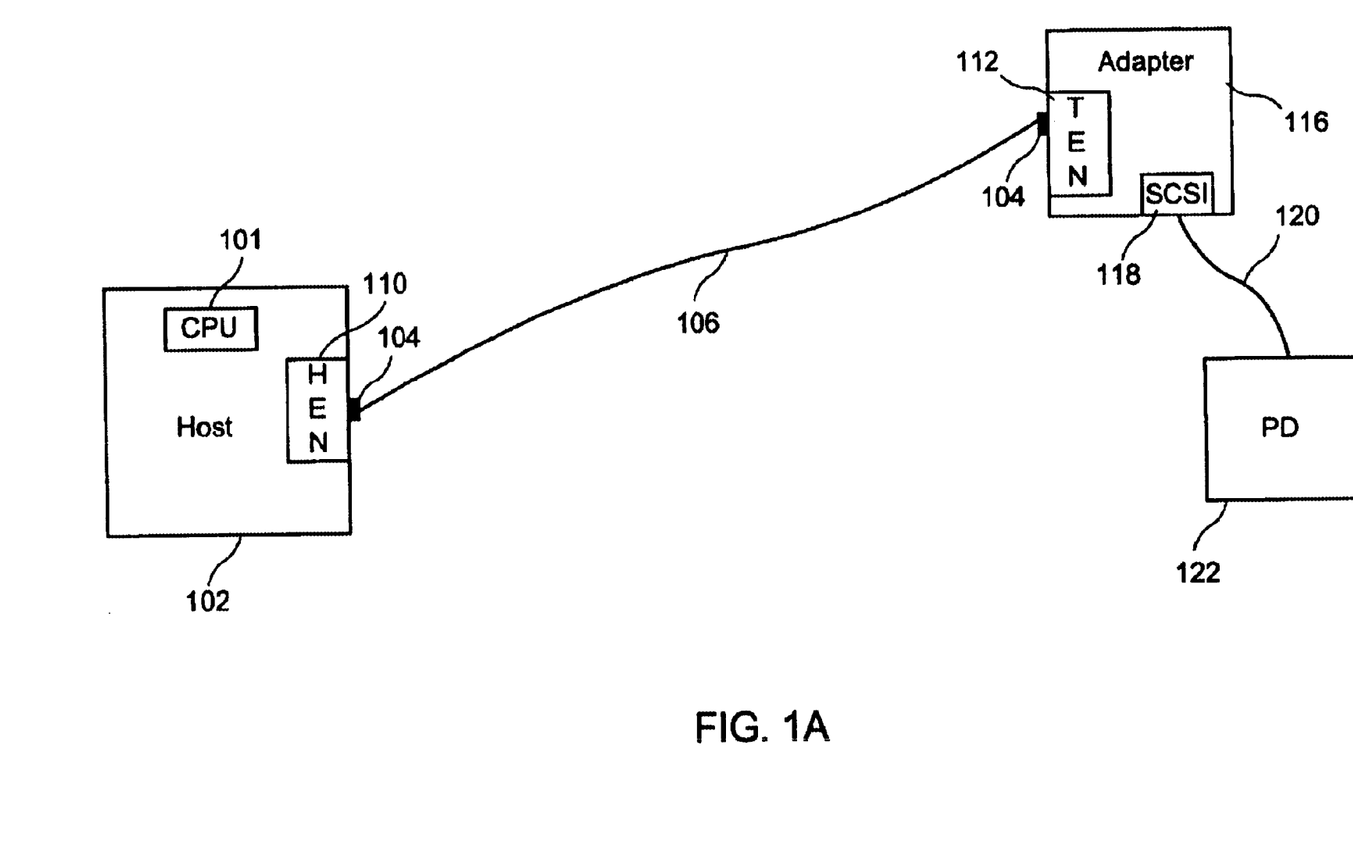
FIG. 1A is an embodiment of the present invention showing a host computer in communication with a peripheral device.

FIG. 1A is an embodiment of the present invention showing a host computer 102 in communication with a peripheral device 122. The host computer 102 contains host end node logic 110 having a connector 104 connected to the host end node logic 110, and a microprocessor 101. The host computer 102 may be any processing device, including a personal computer, or any other device containing at least a processor and memory. The host end node logic 110 allows the adapter to become an end node on the Future I/O fabric.

The host computer 102 is connected to an adapter 116 by way of an interconnecting link (e.g., direct cable, networked cable, or the like) that is defined as a logical path 106. The logical path 106 extends from the connector 104 of the host computer 102 to a connector 104 of the adapter 116. The connector 104 connects the logical path 106 to the target end node logic 112 of the adapter 116. The target end node logic 112 of the adapter 116 allows connection between the adapter 116 and the Future I/O fabric. Therefore, the adapter 116 is an end node on the Future I/O fabric. The adapter 116 is logically remote from the host computer 102 such that the adapter 116 may be at any location away from the host computer 102. On the same token, the adapter 116 can also be sitting next to or in an enclosure of the host computer 102, although, the adapter 116 would still be viewed as "logically remote." The adapter 116 contains a small computer system interface (SCSI) logic 118. Any peripheral device may then be connected to SCSI logic 118, for example, a hard drive, an optical disc drive or any other storage media. As shown in FIG. 1A, the SCSI logic 118 is connected by a cable 120 to a peripheral device 122.

The host computer 102 may boot up using a boot image located on the peripheral device 122, which can be located anywhere on the Future I/O fabric. When the host computer 102 uses the peripheral device 122 to boot, the host computer 102 uses its own microprocessor 101. Therefore, when a user boots the host computer 102 using a boot image stored on the peripheral device 122, the host computer 102 will not be dependent on its BIOS to execute the booting of the host computer 102. As is known, the term "BIOS" has specific significance in regard to Intel-based machines, however, other non-Intel systems also use some type of memory during bootup. These memory devices are often generally referred to as option read only memory (ROM) executables. For brevity, the term "BIOS/ROM" will be used in this document, however, this use should be interpreted to include either one of a BIOS chip or an Option ROM executable chip. Additionally, a microprocessor of a remote computer is not used or needed to boot a computer which is accessing the peripheral device 122 for booting purposes in a Future I/O environment. The host computer 102 communicates with the peripheral device 122 during the booting procedure through a series of block input and output messages from the host computer 102 to the peripheral device 122, as will be discussed in further detail with respect to FIG. 4. When the host computer 102 communicates with the peripheral device 122, the memory of the host computer 102 is communicating directly with the peripheral device 122, as will be discussed further with reference to FIG. 3A.

Figure 1B:
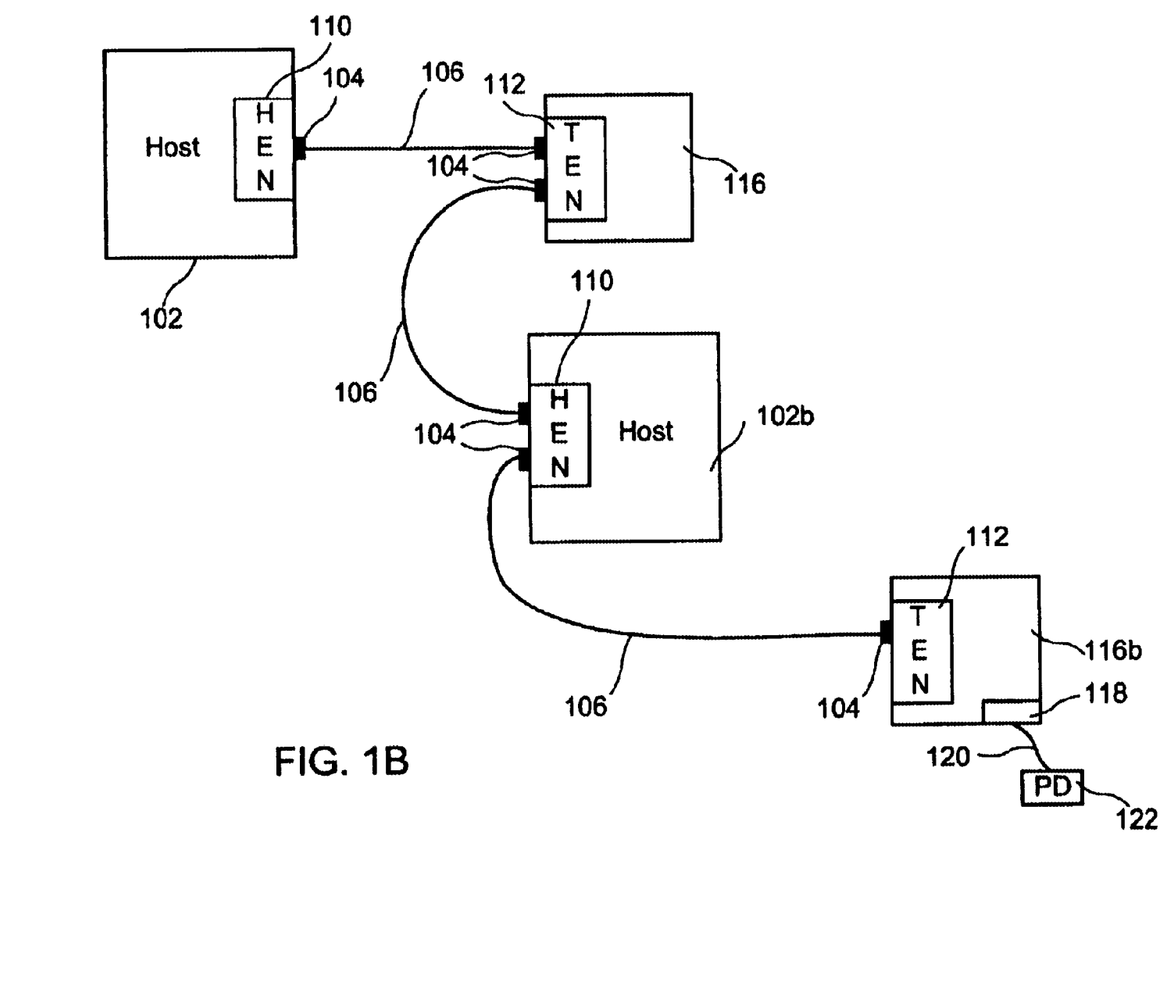
FIG. 1B is another embodiment of the present invention illustrating a first host computer connected to a second host computer such that the first host computer may boot from storage mediums connected to the second host computer.

FIG. 1B is another embodiment of the present invention. A host computer 102 is connected to another host computer 102b, with the host computer 102b being connected to a peripheral device 122. Here, the host computer 102 is able to boot from the peripheral device 122 through its connection with the host computer 102b. The host computer 102 connects to an adapter 116 through logical path 106. From the adapter 116, connection is established with host computer 102b through the logical path 106. From the host computer 102b, connection is established with a peripheral device 122 by way of cable 120 through an adapter 116b. The host computer 102b communicates with the adapter 116b through the host end node logic 110 on the host 112b and the target end node logic 112 on the adapter 116b. In this example, the adapter 116b has SCSI logic 118 which connects to the peripheral device 122.

Thus, the host computer 102 is able to boot from the peripheral device 122 through its interconnection with host computer 102b (which simply acts as an end node on the Future I/O fabric). As can be seen from FIG. 1B, the host computer 102 is able to communicate with other peripheral devices through other host computers. It should be noted that the host computer 102 is able to boot from the peripheral device 122 through the use of message-based commands such as input/output reads, input/output writes and the like. These input-output reads and input-output writes are independent of file systems. Thus, the host computer 102 is able to communicate with the peripheral device 122 through file systemless input/output transactions. Furthermore, it should also be noted that as the host computer 102 boots from the peripheral device 122, the microprocessor of the host computer 102 is used during the booting operation.

Figure 1C:
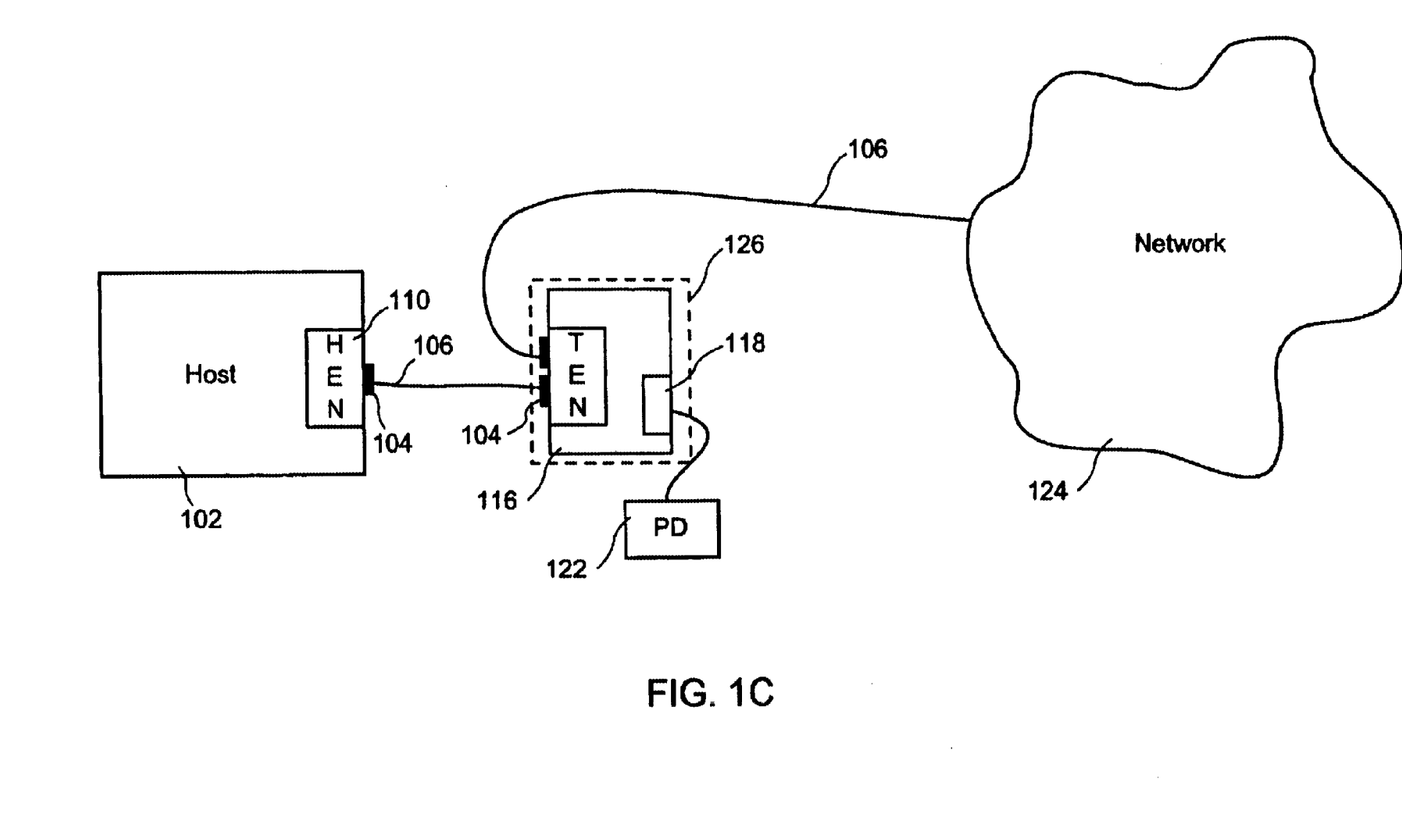
FIG. 1C is an embodiment of the present invention depicting a separate enclosure that surrounds the adapter.

FIG. 1C is an embodiment depicting a separate enclosure 126 that preferably surrounds the adapter 116. The enclosure 126 is preferably an electromagnetic interface (EMI), such as one constructed of aluminum. In another embodiment, the enclosure 126 having the adapter 116 (that is an end node) is contained within an enclosure of the host computer 102 (not shown). Also, the host computer 102 is able to boot using boot images stored on peripheral devices (not shown) connected to end nodes located anywhere on a network 124 by way of the adapter 116 using the Future I/O fabric.

Figure 1D:
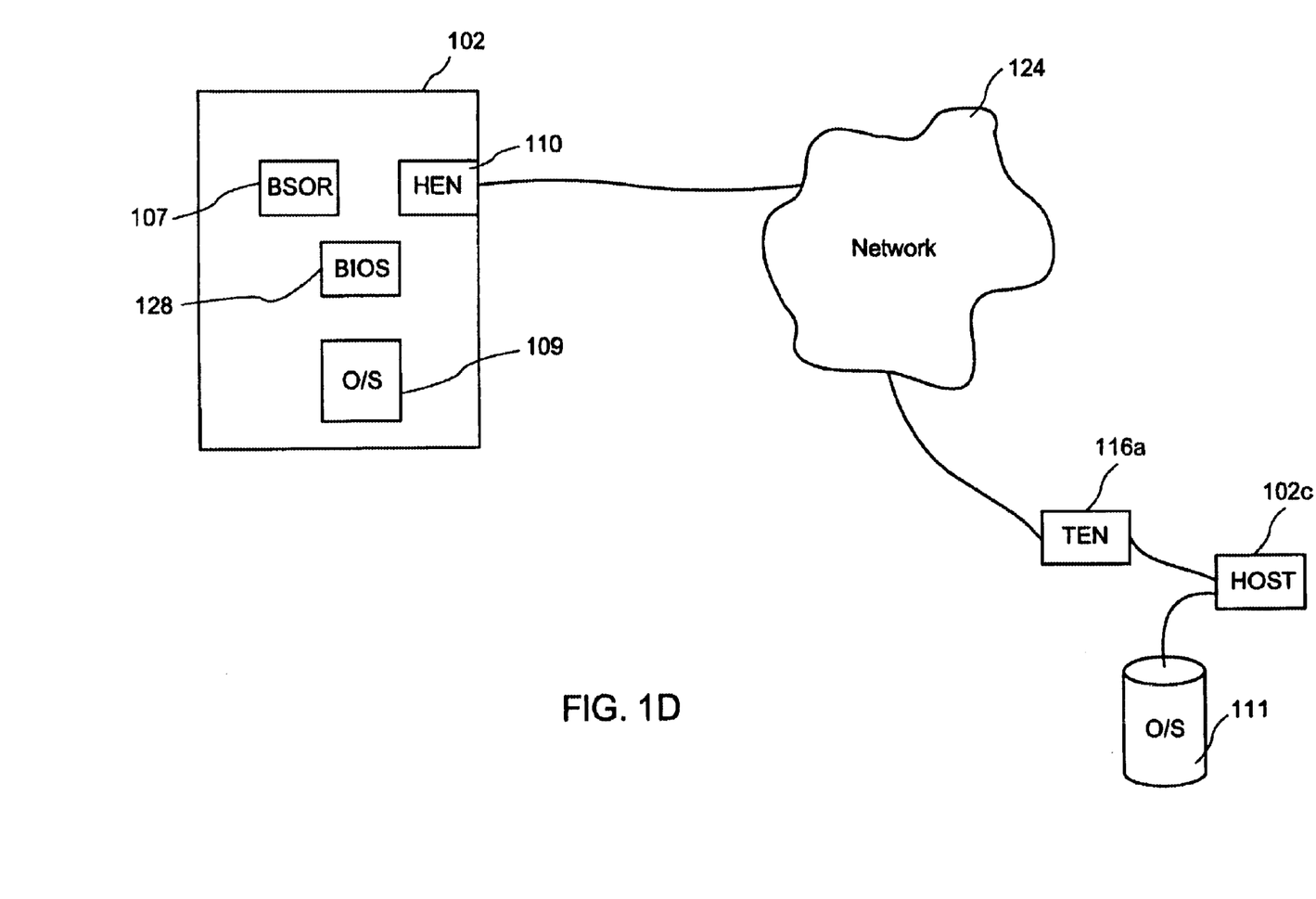
FIG. 1D illustrates a host computer in communication with a storage medium in accordance with one embodiment of the present invention.

FIG. 1D illustrates a host computer 102 in communication with a storage medium 111 in accordance with one embodiment of the present invention. A host computer 102 contains a boot select option ROM (BSOR) 107, a system BIOS 128 and a storage medium 109 containing the native operating system (O/S) for the host computer 102. In one embodiment, when a user powers up the host computer 102, the BSOR 107 allows the user to circumvent the BIOS 128 and instead proceed to boot using boot images contained on the storage medium 111, which is logically remote from the host computer 102. As the host computer 102 boots using boot images contained on the storage medium 111, a microprocessor in the host computer 102 (not shown) will be used to boot the host computer 102 as opposed to a microprocessor of a remote computer.

Figure 2:
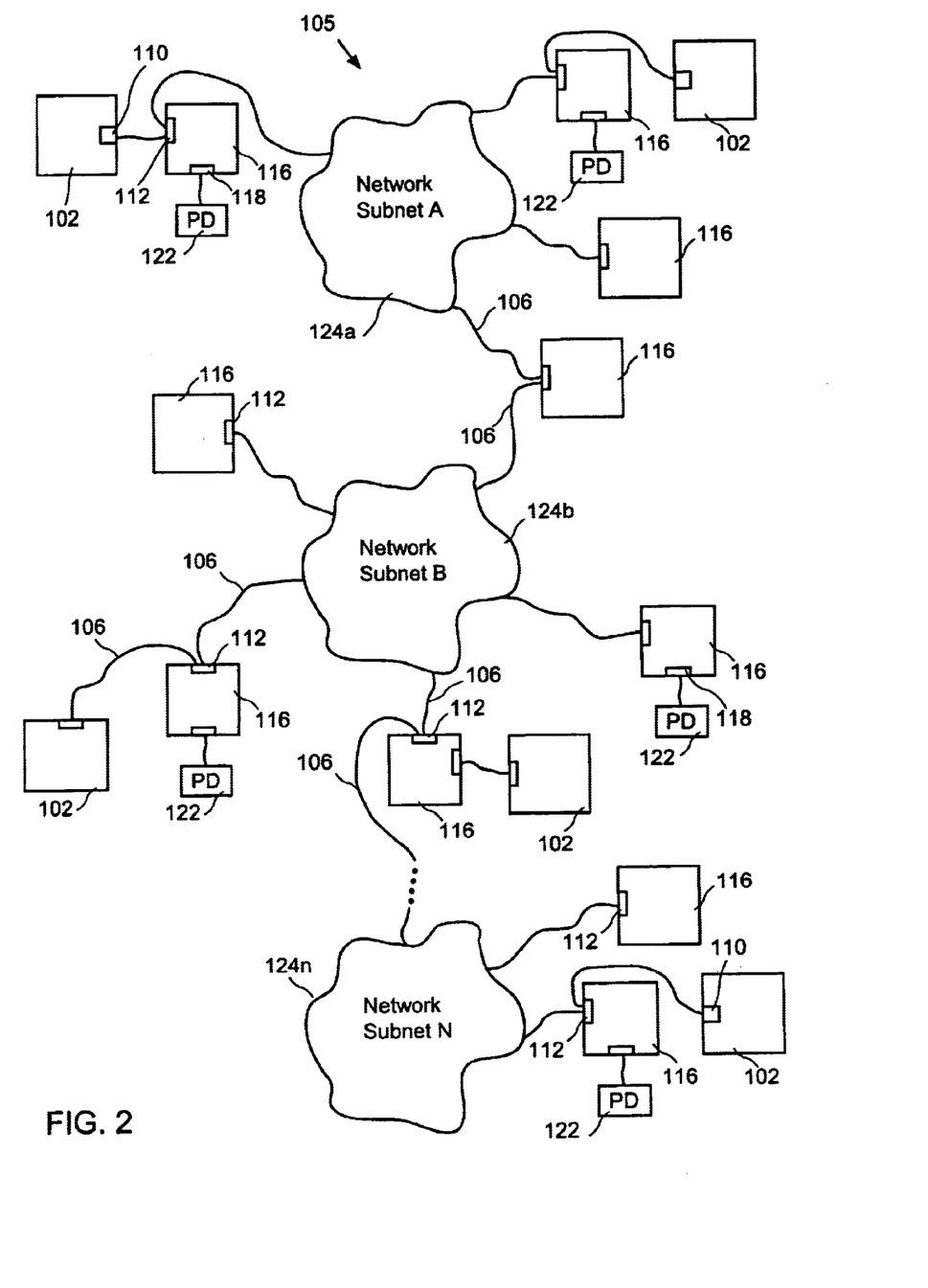
FIG. 2 shows a network having a series of subnets having a plurality of host computers in communication with a plurality of peripheral devices, in accordance with one embodiment of the present invention.

FIG. 2 shows a network 105 having a series of subnets 124a, 124b and 124n having a plurality of host computers 102 in communication with a plurality of peripheral devices 122, in accordance with one embodiment of the present invention. A host computer 102 connected to the subnet 124a may boot from a peripheral device 122 connected to subnet 124n. The host computer 102 of subnet 124a is able to boot from peripheral device 122 of the network 124n through a series of logical path connections 106 to various adapters 116. All the logical path connections 106 use the Future I/O fabric to allow connections between the various subnets and the devices connected to the subnets.

The host computer 102 on subnet 124a can boot from the peripheral device 122 connected to the subnet 124n by sending block I/O reads and writes to the peripheral device 122. Initially, the block I/O from the host computer 102 will go to an adapter 116 and then into the subnet 124a. These messages will then travel from the subnet 124a to an adapter 116 through logical path 106 and then to the subnet 124b. From subnet 124b, the block I/O will travel to the network 124n through the adapter 116. From the network 124n, communication will be made to the peripheral device 122 through another adapter 116. Again, it should be noted that when the host computer 102 on the subnet 124a boots using boot images on the peripheral device 122 on the subnet 124n, the processor of the host computer 102 is used to boot the host computer 102. As can be seen from FIG. 2, a host computer 102 may boot from any peripheral device 122 that is connected to a logically remote end node that is on the network 105. In fact, as mentioned above, even if the peripheral device 122 were physically connected to the computer 102, that peripheral device 122 would be considered logically remote from the standpoint of the Future I/O fabric.

Figure 3A:
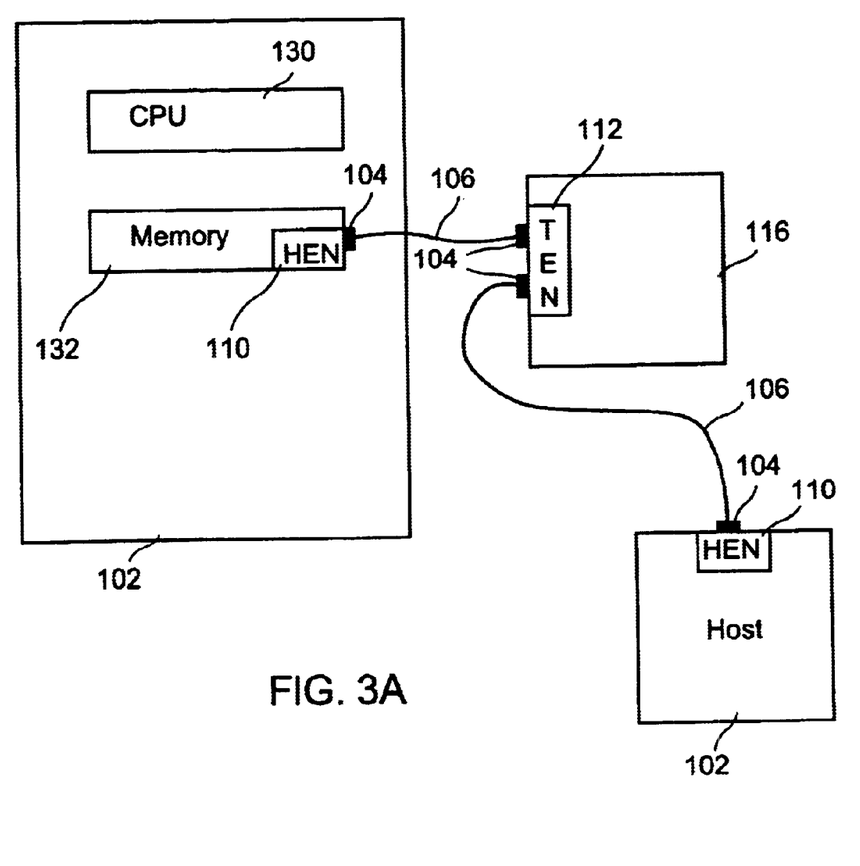
FIG. 3A is another embodiment of the present invention showing the host computer connected to an adapter.

FIG. 3A is another embodiment of the present invention showing the host computer 102 connected to an adapter 116. Here, the host computer 102 has a processor 130 along with memory 132. The memory 132 also contains a host end node logic 110 and a connector 104. As can be seen from FIG. 3A, the adapter 116 is in direct communication with the memory 132 of the host computer 102 through host end node logic 110. Therefore, the host computer 102 is able to complete memory-to-memory communication between the host computer 102 and the adapter 116. As such, processing time is greatly decreased since direct communication is made with the memory 132. Additionally, the direct communication of the adapter 116 with the memory 132 allows the processor 130 of the host computer to be used in booting the host computer 102 from a logically remote end node.

Figure 3B:
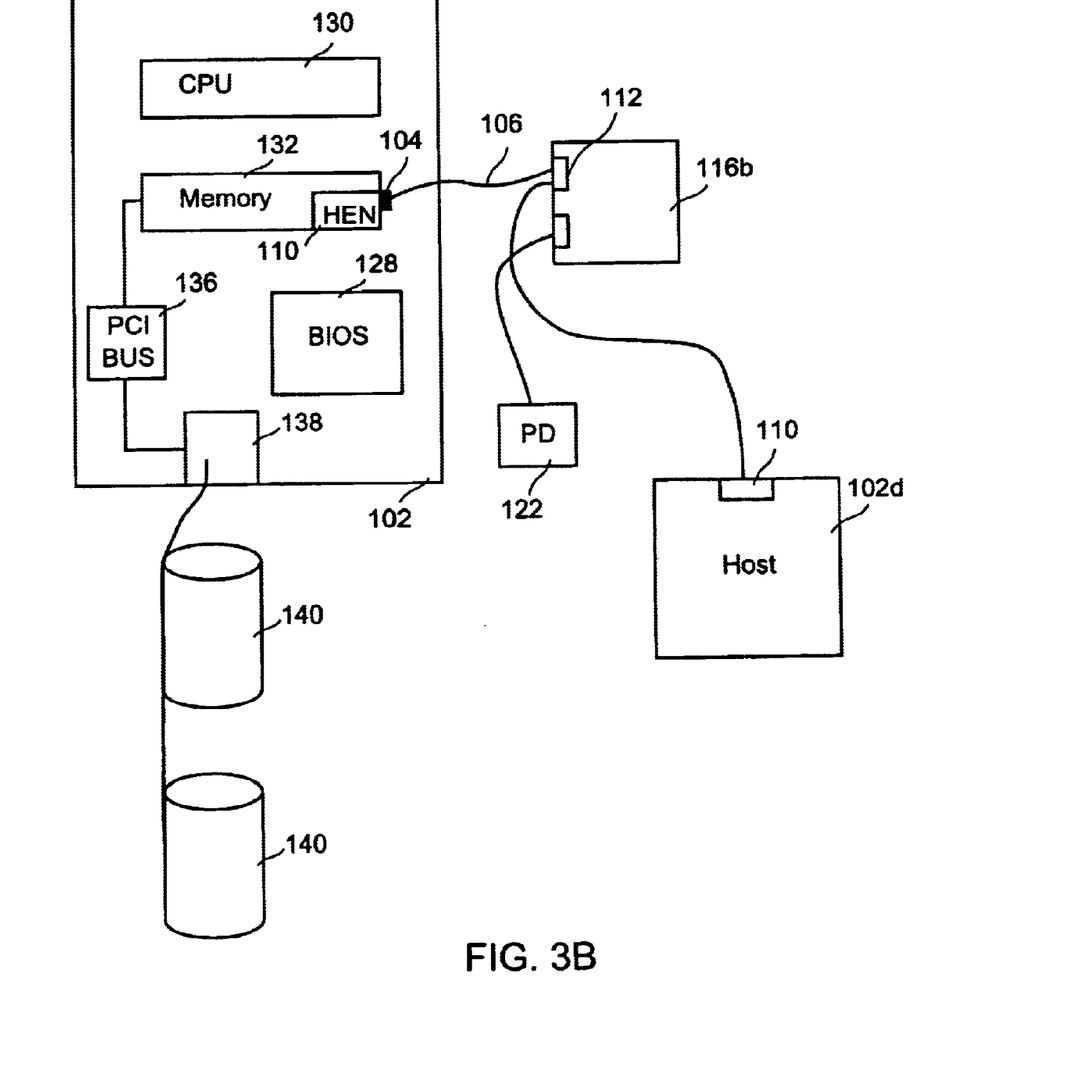
FIG. 3B shows an alternative embodiment of the host computer of the present invention.

FIG. 3B shows an alternative embodiment of the host computer 102 of the present invention. The host computer 102 contains a PCI bus 136 which connects to a PCI slot 138. The PCI slot 138 facilitates connection of storage data mediums 140 with the host computer 102. As is well known, a host adapter, such as a SCSI host adapter, can be used to connect the storage data mediums 140 to the host computer 102. As can be seen, the host computer 102 communicates with the logically remote host computer 102d and the logically remote adapter 116. Thus, the host computer 102 is able to boot using boot images located on peripheral devices connected to the logically remote adapter 116 and the host computer 102d, or from storage data mediums 140 connected to the host computer 102. As such, the host computer 102 is able to use either storage data mediums 140 controlled by a native BIOS/ROM or peripheral devices 122 that are independent of the native BIOS/ROM on the host computer 102 for booting. It should also be noted that the adapter 116 facilitates Future I/O connections between the host computer 102, the host computer 102d and the peripheral device 122.

Figure 4:
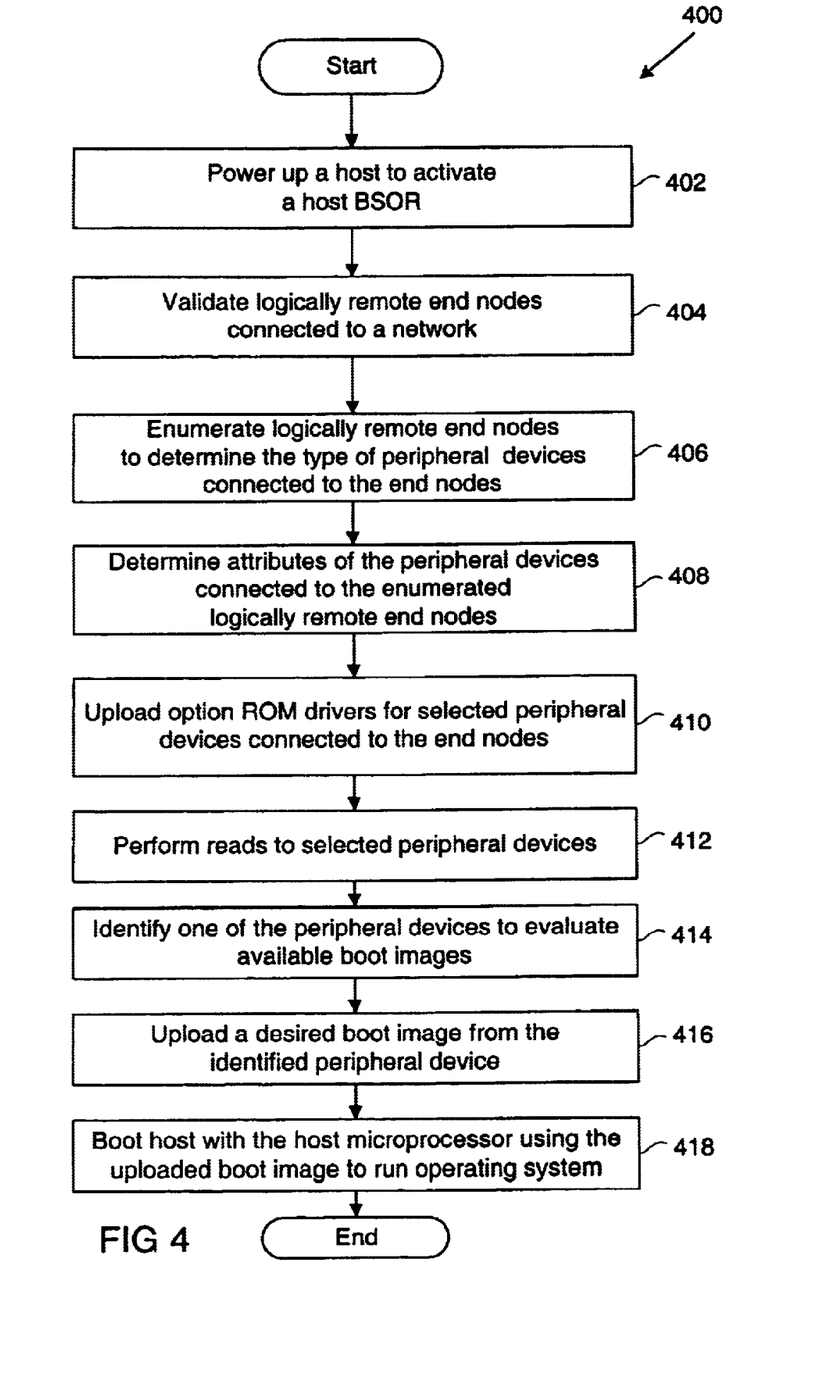
FIG. 4 is a flowchart showing a process of booting a host computer, in accordance with one embodiment of the present invention.

FIG. 4 is a flowchart showing a process 400 of booting a host computer 102, in accordance with one embodiment of the present invention. In operation 402, the user powers up a host to activate a host BSOR of the host computer. As mentioned above, the BSOR allows selection of either booting normally by way of a native BIOS/ROM or logically remote using the Future I/O fabric. After the user powers up the computer, a prompt (e.g., in the form of a graphical user interface, text, or the like) may request the user to input what the user wants to use as a boot source. For example, the boot source may be the host's own storage medium, or it may be a drive connected to an end node on a network to which the host is connected. For example, making reference to FIG. 2, a user powers up the host computer 102 on the subnet 124a. After the user powers up the host computer 102 in operation 402, the host computer 102 asks the user what would the user desire as a boot source.

In the example, a user may request a boot source which is logically remote from the host computer 102, such as a UNIX™ operating system, a Solaris™ operations system, a Windows™-based operations system, etc. Once the user has inputted this information, validation of end nodes connected to the network 105 is processed in operation 404. In operation 404, the method validates logically remote end nodes (e.g., Future I/O end nodes) connected to a network and communicates with the validated logically remote end nodes by sending block I/Os and non-block I/Os to the end nodes. After validation of the logically remote end nodes, the method moves to operation 406. In operation 406, the method enumerates logically remote end nodes to determine the type of peripheral devices connected to the enumerated end nodes. For instance, the method may determine if the peripheral device is a scanner, a printer, a storage medium (e.g. SCSI hard drive, CD-ROM, CD-R,), etc. In one embodiment, the user of the host computer 102 may want to find peripheral devices 122 which are some type of storage medium containing boot images connected to the adapter 116.

In operation 408, the method determines the attributes of the peripheral devices connected to the enumerated logically remote end nodes. For instance, the determination is such that storage mediums which are capable of storing operating systems are identified. Once selected peripheral devices are identified, the method moves to operation 410. In operation 410, the method uploads option ROM drivers to the host from each of the selected peripheral controllers. The option ROM driver enables the host to perform direct memory I/O reads and writes to the peripheral devices connected to the logically remote end nodes. In FIG. 2, the host computer 102 uploads the option ROM driver from the selected peripheral devices 122, which are preferably storage drives. The storage drives can be in the form of standard hard disk drives, RAID storage solutions, or other such storage solutions.

After operation 410 is complete, the method performs reads to the selected peripheral devices in operation 412. For example, the host will perform reads to the storage mediums (which are connected to the logically remote end nodes) to ascertain if there are any available boot images stored thereon. After the reads to the peripheral device 122 are performed in operation 412, the method identifies one of the peripheral devices to evaluate available boot images in operation 414. For instance, if the peripheral device contains boot images, such as, Windows™ operating systems, UNIX™ operating systems, Solaris™ operating systems, Macintosh operating systems, or other types of operating systems, the host computer 102 will identify one of these boot images. In one embodiment, a list of available boot images can be generated for the user by way of a graphical user interface (GUI, text interface, or the like). The user can then select what boot image to use to boot the host. In one example, the user may desire to run the UNIX™ operating system. Thus, the user could then select a UNIX™ operating system if it was found on the drive.

In operation 416, the method uploads the UNIX™ boot image from the end node of the Future I/O fabric to the host. The host computer 102 is then booted up in operation 418 using the selected boot image. In a preferred embodiment, the booting is facilitated by the host's resident microprocessor, without the assistance of a remote computer processor. After the host is booted, the process 400 in FIG. 4 is complete.

As can be seen, the embodiments of the present invention facilitate booting of a host from a logically remote peripheral device. The peripheral device is connected to an adapter (e.g., an end node) which is connected to the host on the Future I/O fabric. The host can process memory-to-memory block I/O and non-block I/O communication between the host and logically remote peripheral devices. The processor of the host is then used to boot the host without using the processor of a remote computer. Therefore, it is possible to boot from any storage medium connected to a logically remote end node.

The embodiments of the present invention also eliminate direct programmed input/output (PIO) transactions, and instead provide for direct memory access (DMA) transactions and remote messaging. In addition, a user is able to run applications using many different operating systems which need not be stored on the host's own storage medium. Thus a user using a machine that operates using Windows™ NT may run UNIX™ applications by booting the UNIX™ operating system from a logically remote end node.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for remotely booting a computer, comprising:
   validating end nodes that are logically remote;
   communicating with a validated end node;
   determining whether the validated end node has a desired boot image to boot the computer; and
   booting the computer using the desired boot image obtained from the validated end node, the booting being performed without operationally involving a processor of a remote end node, the booting being performed independent of a BIOS or ROM executable of the computer.

2. A method for remotely booting a computer as recited in claim 1, wherein the operation of validating logically remote end nodes further comprises:
   communicating file systemless input/output (I/O) data with the validated end node, the validated end node being coupled to the computer over a network.

3. A method for remotely booting a computer as recited in claim 2, wherein the file systemless I/O data communication is message based I/O.

4. A method for remotely booting a computer as recited in claim 2, wherein the file systemless I/O data communication enables one of block I/O transactions and non-block I/O transactions.

5. A method for remotely booting a computer as recited in claim 4, wherein block I/O transactions include transactions to disk storage media and non-block I/O transactions include transactions to tape storage media.

6. A method for remotely booting a computer as recited in claim 1, wherein the BIOS or ROM executable of the computer is not used during the validation.

7. A method for remotely booting a computer as recited in claim 1, wherein the desired boot image can be accessed by one or more computers simultaneously desiring to boot using the desired boot image, the desired boot image residing on storage that is logically remote to each of the one or more computers.

8. A method for remotely booting a computer as recited in claim 1, wherein the operation of determining whether the validated end node has a desired boot image to boot the computer further includes:
   enumerating the validated end node which is logically remote to determine what type of peripheral devices are connected to the validated end node; and
   ascertaining what boot images are available on the peripheral devices.

9. A method for remotely booting a computer as recited in claim 1, wherein the operation of communicating with a validated end node occurs before the computer is booted up.

10. A method for remotely booting a computer as recited in claim 1, wherein the method automatically initiates the booting of the computer.

11. A method for booting a computer from a remote source, comprising:
    validating logically remote end nodes on a network;
    communicating with the validated logically remote end nodes;
    ascertaining what boot images are available from the validated logically remote end nodes;
    uploading an ascertained boot image from a validated logically remote end node; and
    booting the computer with the uploaded boot image without the assistance of a remote end node, the booting being performed without use of a BIOS or ROM executable of the computer.

12. A method for booting a computer from a remote source according to claim 11, wherein the operation of communicating with the validated logically remote end nodes is done before the computer is booted up.

13. A method for booting a computer from a remote source according to claim 11, wherein the operation of validating logically remote end nodes on a network further includes:
    communicating message based, file systemless input/output (I/O) data with the logically remote end nodes.

14. A method for booting a computer from a remote source according to claim 13, wherein the file systemless I/O data communication enables one of block I/O transactions and non-block I/O transactions.

15. A method for booting a computer from a remote source according to claim 11, wherein a processor of a remote computer is not operationally involved in the booting of the computer.

16. A method for booting a computer from a remote source according to claim 11, wherein the BIOS or ROM executable of the computer is not used during the validation operation.

17. A method for booting a computer from a remote source according to claim 11, wherein the ascertained boot image is accessible by a number of computers desiring to boot using the ascertained boot image, the ascertained boot image being remotely located with respect to the number of computers.

18. A method for booting a computer from a remote source according to claim 11, wherein the method enables manual initiation of the booting of the computer.

19. A method for remotely booting a computer, comprising:

accessing a boot select option ROM (BSOR), wherein the BSOR allows the computer to boot from one of a logically remote end node or a local storage medium of the computer;

validating logically remote end nodes;

determining whether a validated logically remote end node contains boot images to boot the computer; and booting the computer with an uploaded boot image from the validated logically remote end node with a microprocessor of the computer, the booting being performed without use of a native BIOS or ROM executable of the computer.

20. A method for remotely booting a computer as recited in claim 19, wherein a native BIOS or ROM executable of the computer is not used during the validation operation.

* * * * *